(12) United States Patent
Koustubhan et al.

(10) Patent No.: US 12,497,174 B2
(45) Date of Patent: Dec. 16, 2025

(54) OWEED DIVAN WITH FOLD-DOWN BACKREST FOR EGRESS AND INFLATABLE RESTRAINT FOR OCCUPANT PROTECTION

(71) Applicant: B/E Aerospace, Inc., Winston-Salem, NC (US)

(72) Inventors: Arjun Koustubhan, Hyderabad (IN); Moises Perez, Miami, FL (US); Michael L. Oleson, Parkland, FL (US)

(73) Assignee: B/E Aerospace, Inc., Winston-Salem, NC (US)

( * ) Notice: Subject to any disclaimer, the term of this patent is extended or adjusted under 35 U.S.C. 154(b) by 168 days.

(21) Appl. No.: 18/377,163

(22) Filed: Oct. 5, 2023

(65) Prior Publication Data
US 2025/0066023 A1 Feb. 27, 2025

(30) Foreign Application Priority Data
Aug. 24, 2023 (IN) .............................. 202341056760

(51) Int. Cl.
B64D 11/06 (2006.01)
(52) U.S. Cl.
CPC ...... B64D 11/064 (2014.12); B64D 11/06205 (2014.12)
(58) Field of Classification Search
CPC ........ B60N 2/3006; B60N 2/16; B60N 2/163; B64D 11/06205; B64D 11/064; B64D 11/0639
See application file for complete search history.

(56) References Cited

U.S. PATENT DOCUMENTS

| | | | |
|---|---|---|---|
| 4,679,749 A * | 7/1987 | Ryan | B64D 11/0691 297/15 |
| 4,781,414 A * | 11/1988 | Periou | B60N 2/163 297/313 |
| 6,595,588 B2 | 7/2003 | Ellerich et al. | |

(Continued)

FOREIGN PATENT DOCUMENTS

| EP | 1968814 B1 | 11/2009 |
|---|---|---|
| EP | 3222523 B1 | 9/2019 |

(Continued)

OTHER PUBLICATIONS

European Patent Office, Extended European Search Report received in EP Application No. 24195202.7, Oct. 15, 2024, 7 pages.

*Primary Examiner* — Daniel J Rohrhoff
(74) *Attorney, Agent, or Firm* — Suiter Swantz IP

(57) ABSTRACT

A divan for installation in an aircraft cabin in relation to an emergency exit. In embodiments, the divan includes at least two seats wherein one seat is positioned directly in front of the emergency exit and includes a lower frame assembly and an upper frame assembly. The upper frame assembly includes a seat pan subassembly configured to raise and lower relative to the lower frame assembly, and a backrest subassembly rotatably attached to the seat pan subassembly. In use, the backrest rotates to a position overlaying the seat pan subassembly and the seat pan subassembly lowers toward the floor to achieve a step-up height of not more than 20 inches to comply with the step-up height requirements for a Type-III emergency exit.

20 Claims, 11 Drawing Sheets

(56) References Cited

U.S. PATENT DOCUMENTS

| | | | | |
|---|---|---|---|---|
| 8,297,703 | B2* | 10/2012 | Ehrhard | B60N 2/3065 |
| | | | | 297/331 |
| 8,678,501 | B2 | 3/2014 | Jockel | |
| 8,746,735 | B2* | 6/2014 | Meister | B64D 11/06205 |
| | | | | 280/733 |
| 10,427,794 | B2 | 10/2019 | Erhel | |
| 11,059,589 | B2 | 7/2021 | Oleson et al. | |
| 2005/0104431 | A1* | 5/2005 | Saberan | B60N 2/206 |
| | | | | 297/331 |
| 2009/0001795 | A1* | 1/2009 | Homier | B60N 2/22 |
| | | | | 297/340 |
| 2014/0049085 | A1* | 2/2014 | Seibold | B60N 2/3013 |
| | | | | 297/340 |
| 2016/0244173 | A1* | 8/2016 | Deevey | B64D 11/06205 |
| 2016/0280171 | A1* | 9/2016 | Moeller | B60R 22/12 |
| 2017/0305306 | A1* | 10/2017 | Park | B60N 2/065 |
| 2018/0118350 | A1* | 5/2018 | Davis | B64D 11/064 |
| 2019/0217754 | A1* | 7/2019 | Fukawatase | B60R 22/26 |
| 2020/0039651 | A1* | 2/2020 | Oleson | B64D 11/0629 |
| 2023/0234482 | A1* | 7/2023 | Bonk | B60N 2/3031 |

FOREIGN PATENT DOCUMENTS

| | | | |
|---|---|---|---|
| EP | 2939920 | B1 | 10/2021 |
| WO | 2012162123 | A1 | 11/2012 |

* cited by examiner

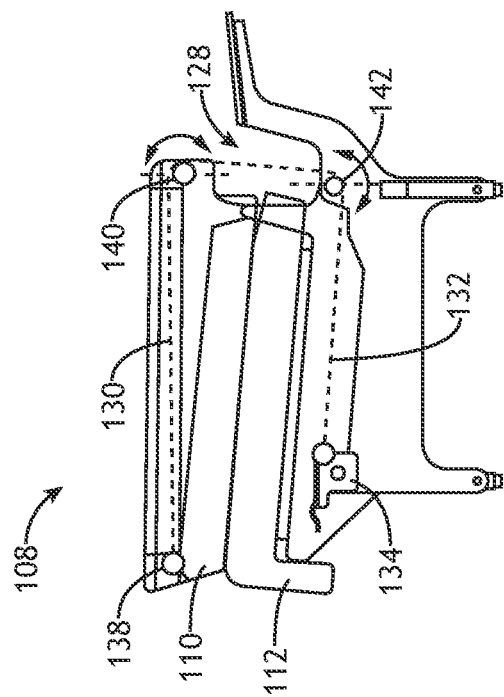
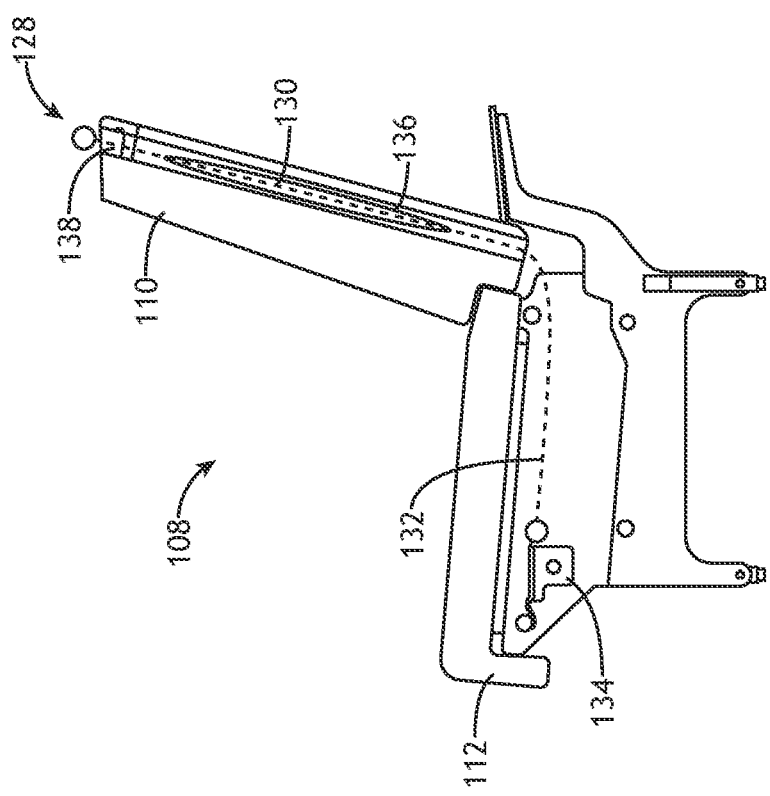
FIG. 3B
FIG. 3A

OWEED DIVAN WITH FOLD-DOWN BACKREST FOR EGRESS AND INFLATABLE RESTRAINT FOR OCCUPANT PROTECTION

CROSS-REFERENCE AND INCORPORATION BY REFERENCE

This nonprovisional application claims the benefit of priority of India Application No. 202341056760 filed Aug. 24, 2023, which is hereby incorporated by reference in its entirety.

TECHNICAL FIELD AND BACKGROUND

The present disclosure relates generally to a divan for use in an aircraft, and more particularly, to a divan including a repositionable upper frame assembly for achieving step-up height compliance to allow installation of the divan in front of an emergency exit, for instance a Type-III over-wing emergency exit door (OWEED).

Aircraft such as business and private jets require exits for use during emergency events. Federal Aviation Regulation (FAR) Sec. 25.801 defines different exit types and requirements depending on the aircraft, passenger seating configuration, number of exits, exit locations with respect to the wings, etc. For example, Type-I exits are defined as floor-level exits and are required to have a rectangular opening of not less than 24 inches wide by 48 inches high, with corner radii not greater than 8 inches. Type-II exits are required to have a rectangular opening of not less than 20 inches wide by 44 inches high, with corner radii not greater than 7 inches. Type-III exits, to which the present disclosure finds particular application, are required to have a rectangular opening of not less than 20 inches wide by 36 inches high, with corner radii not greater than 7 inches. Lastly, Type-IV exits are required to have a rectangular opening of not less than 19 inches wide by 26 inches high, with corner radii not greater than 6.3 inches.

When located over a wing, at least Type-II, Type-III, and Type-IV exits have further requirements in terms of step-up height and step-down height, wherein step-up height means the distance from the cabin floor to the bottom of the required opening, and step-down height means the distance from the bottom of the required opening to a usable foothold. For example, when located over a wing, a Type-II exit must have a step-up height inside the aircraft of not more than 10 inches and a step-down height outside the aircraft of not more than 17 inches, a Type-III exit must have a step-up height inside the aircraft of not more than 20 inches and a step-down height outside the aircraft of not more than 27 inches, and Type-IV exits must have a step-up height inside the aircraft of not more than 29 inches and a step-down height outside the aircraft of not more than 36 inches. The requirements regarding the required opening size, corner radii, step-up height, and step-down height exist to facilitate passenger egress and rescue personnel ingress as necessary during an emergency event.

In addition to the different emergency exit types and configurations, business and private jets may be configured with different passenger seating configurations. For example, passenger seating configurations may include individual passenger seats and divans (e.g., couches, sofas, etc.) in various number, locations, groupings, facing orientations, etc. Divans, which typically include at least two laterally adjacent seating positions, are typically oriented side-facing and positioned against a fuselage wall considering their longitudinal length as compared to an individual passenger seat, as well as the clearance needed to transition the divan from an upright sitting position to a bed, commonly referred to as "berthing."

Conventional divan measurements and configurations preclude their installation in a side-facing orientation positioned directly in front of a Type-II, Type-III or Type-IV exit door. More specially, the divan backrest blocks the exit opening, and at least the backrest height of the divan far exceeds the maximum allowable step-up height requirements. As such, the placement of passenger seating in an aircraft, and in particular divans, is dictated by the locations of the emergency exits.

Therefore, what is needed is a divan solution that provides greater flexibility in terms of passenger seating placement in an aircraft.

BRIEF SUMMARY

In one aspect, the present disclosure provides a divan including two or more laterally adjacent seats for positioning in relation to an emergency exit in an aircraft, for instance a Type-III over-wing exit pursuant to FAR Sec. 25.801. In embodiments, the divan includes a lower frame assembly attachable to a floor and an upper frame assembly including movable elements. In embodiments, the upper frame assembly includes a seat pan subassembly movably attached to the lower frame assembly, and a backrest subassembly rotatably attached to the seat pan subassembly. In embodiments, the divan further includes a lock assembly configured to lock at least one of rotational motion of the backrest subassembly relative to the seat pan subassembly, and motion of the seat pan subassembly relative to the lower frame assembly. In use, the backrest subassembly is configured to rotate between a first position in which the backrest subassembly is upright and a second position in which the backrest assembly overlays the seat pan subassembly, and the seat pan subassembly is configured to raise and lower relative to the lower frame assembly.

In at least some embodiments, a height of the backrest subassembly, when the backrest subassembly is in the second position and the seat pan subassembly is fully lowered relative to the lower frame assembly, is not more than 20 inches, as measured from a floor to which the lower frame assembly is attached to a top of the backrest subassembly when in the second position.

In at least some embodiments, the lower frame assembly further includes a step positioned behind the seat pan subassembly, wherein the step and the backrest subassembly, when the backrest subassembly is in the second position, are substantially horizontally aligned.

In at least some embodiments, the divan further includes a passenger restraint assembly including a first webbing portion routed through the backrest subassembly, an airbag associated with the first webbing portion, a second webbing portion continuous with the first webbing portion and routed through the seat pan assembly, and a retractor upon which the second webbing portion is wound.

In at least some embodiments, the passenger restraint assembly further includes at least one first roller rotatably mounted to the backrest subassembly and configured to interact with the first webbing portion, and at least one second roller rotatably mounted to the seat pan subassembly and configured to interact with the second webbing portion.

In at least some embodiments, the seat pan subassembly and the lower frame assembly interface via a guide assembly configured to guide vertical motion of the seat pan subassembly relative to the lower frame assembly, and the guide assembly includes at least one guide carried on one of the seat pan subassembly and the lower frame assembly, and at least one slot formed on the other of the seat pan subassembly and the lower frame assembly, the at least one guide configured to travel along the at least one slot.

In at least some embodiments, the divan further includes at least one first damper having a first end mounted to the backrest subassembly and a second end mounted to the seat pan subassembly, the at least one first damper, when fully extended, configured to prevent further rotation of the backrest subassembly toward the seat pan subassembly.

In at least some embodiments, the divan further includes at least one second damper having a first end mounted to the seat pan subassembly and a second end mounted to the lower frame assembly, the at least one second damper configured to control vertical motion of the seat pan subassembly relative to the lower frame assembly.

In at least some embodiments, the lock assembly includes a backrest lock subassembly including at least one lock mounted to one of the seat pan subassembly and the backrest subassembly, and at least one pin mounted to the other of the seat pan subassembly and the backrest subassembly, each lock configured to capture and release its respective pin, a seat pan lock subassembly including at least one lock mounted to one of the seat pan subassembly and the lower frame assembly, and at least one pin mounted to the other of the seat pan subassembly and the lower frame assembly, each lock configured to capture and release its respective pin, a first actuator accessible from an inboard side of the divan, a second actuator accessible from an outboard side of the divan, and cabling interconnecting each of the first and second actuators to each of the locks of each of the backrest lock subassembly and the seat pan lock subassembly.

According to another aspect, the present disclosure provides a passenger seating configuration for an aircraft including an emergency exit positioned in an exterior wall and over a wing of the aircraft. The passenger seating arrangement includes a divan, as provided above, positioned against the exterior wall and facing inboard, with the divan including two or more laterally adjacent seats, and at least one of the seats positioned directly in front of the emergency exit.

In at least some embodiments, the emergency exit is a Type-III exit pursuant to Federal Aviation Regulation (FAR) Sec. 25.801, and a height of the backrest subassembly, when the backrest subassembly is in the second position and the seat pan subassembly is fully lowered relative to the lower frame assembly, is not more than 20 inches, as measured from a floor to which the lower frame assembly is attached to a top of the backrest subassembly when in the second position.

This summary is provided solely as an introduction to subject matter that is fully described in the following detailed description and drawing figures. This summary should not be considered to describe essential features nor be used to determine the scope of the claims. Moreover, it is to be understood that both the foregoing summary and the following detailed description are explanatory only and are not necessarily restrictive of the subject matter claimed.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings:

FIG. 3A is a side view of the repositionable divan seat illustrating passenger restraint assembly routing when the backrest subassembly is upright, in accordance with example embodiments of this disclosure;

FIG. 3B is a side view of the repositionable divan seat illustrating passenger restraint assembly routing when the backrest subassembly is rotated to an overlaying position, in accordance with example embodiments of this disclosure;

DETAILED DESCRIPTION

Figure 1A:
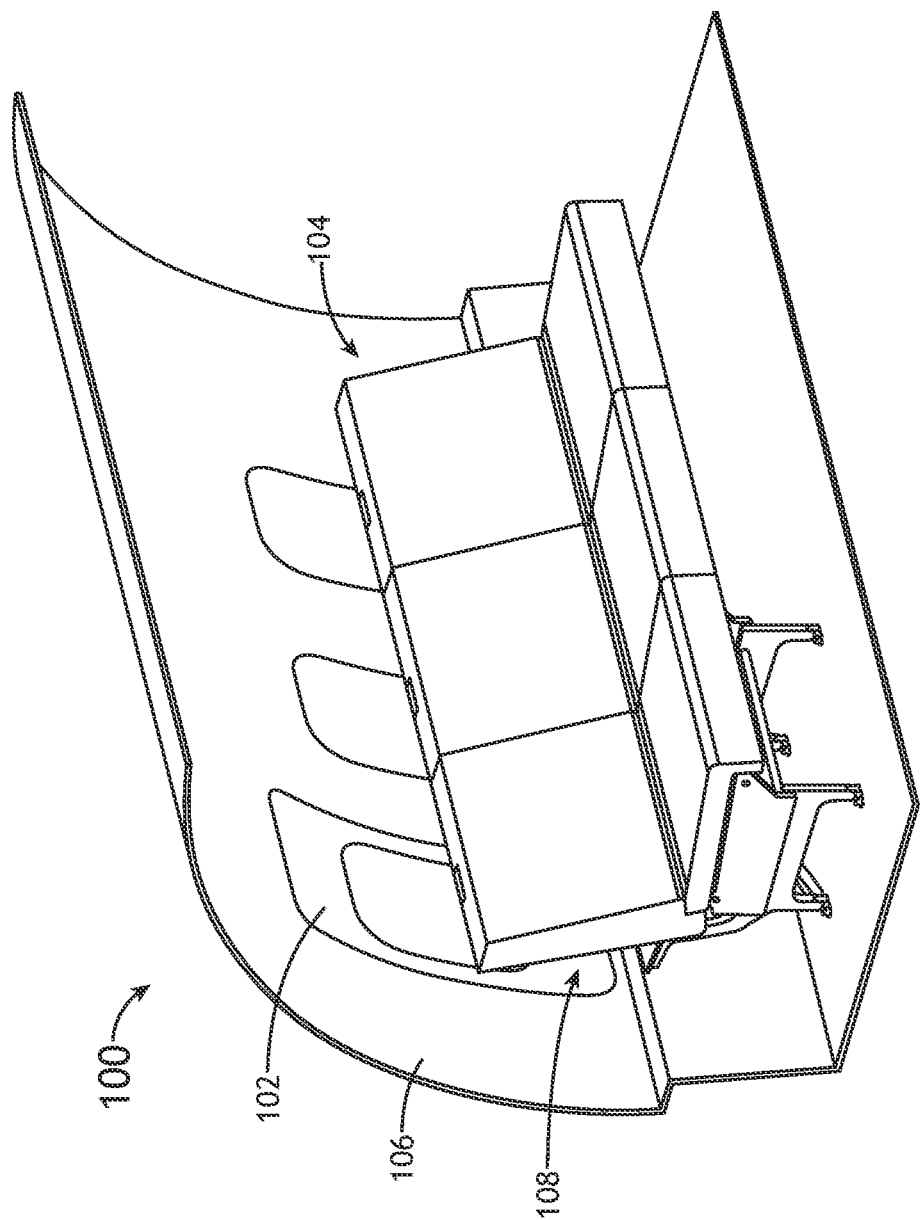
FIG. 1A is a perspective view of an aircraft cabin including a divan positioned in relation to an emergency exit, in accordance with example embodiments of this disclosure.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein, a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a divan assembly for installation, for example, in an aircraft passenger cabin. As used herein, "divan" means any passenger seat, couch, sofa, and the like. In embodiments, the divan includes repositionable elements that allow the divan to be converted between an upright sitting position for use during taxi, takeoff, and landing (TTOL) and during flight, and a collapsed configured for use during an emergency event. In embodiments, the divan is capable of being positioned directly in front of an emergency exit, for instance a Type-III over-wing emergency exit door (OWEED) because the divan, when collapsed, is capable of achieving a step-up height of not more than 20 inches.

In embodiments, the divan may include one or more seats defining one or more seating positions. In the case of two or more seats, the seats are positioned laterally adjacent such that two or more passengers may be seated side-by-side when the divan is configured upright for seating. In some embodiments, the divan includes at least two seats, wherein at least one of the seats is repositionable to achieve step-up compliance as discussed further below. For example, as illustrated in some of the drawings, the divan may include three seats wherein one end seat is configured to be repositionable and the other two seats may lack repositionable functionality to simplify cost and complexity of the divan. Also, in most aircraft configurations, two separate emergency exits are not positioned in close proximity to require a divan with two separate repositionable seats, although it is envisioned that the divan may include at least two repositionable seats for installation flexibility. In the case of a three-seat divan, one or more of the ends seats and the middle seat may be configured as repositionable as provided herein. For clarity of this disclosure, most of the figures show an individual seat that may be part of a larger divan assembly. Although not shown, the repositionability functionality of the divan is compatible for use with additional adjustment capabilities, for instance berthing frame assemblies.

In embodiments, each of the upper and lower assemblies described below may generally include frame members interconnected by transverse frame members, the configuration of which is not critical to the implementation of the divan seat functionality. In addition, each of the backrest and the seat pan subassemblies described below may generally include rigid frame members support cushions for comfort and support, the configuration of which is also not critical to implementation of the divan seat functionality. In other words, each of the assemblies and subassemblies described herein may vary in construction while still providing the repositioning functionality described in detail below. As such, the particular frame constructions shown in the figures are intended to be exemplary and not limiting.

Some advantages of the divan according to the present disclosure include, but are not limited to, greater flexibility in terms of passenger seating in an aircraft passenger cabin, the ability to position the divan, and more particularly a repositionable seat of the divan, directly in front of a predefined type of emergency exit while complying with exit egress/ingress requirements, and a TTOL compliant divan capable of being installed against a fuselage wall and in a side-facing orientation.

Figure 1B:
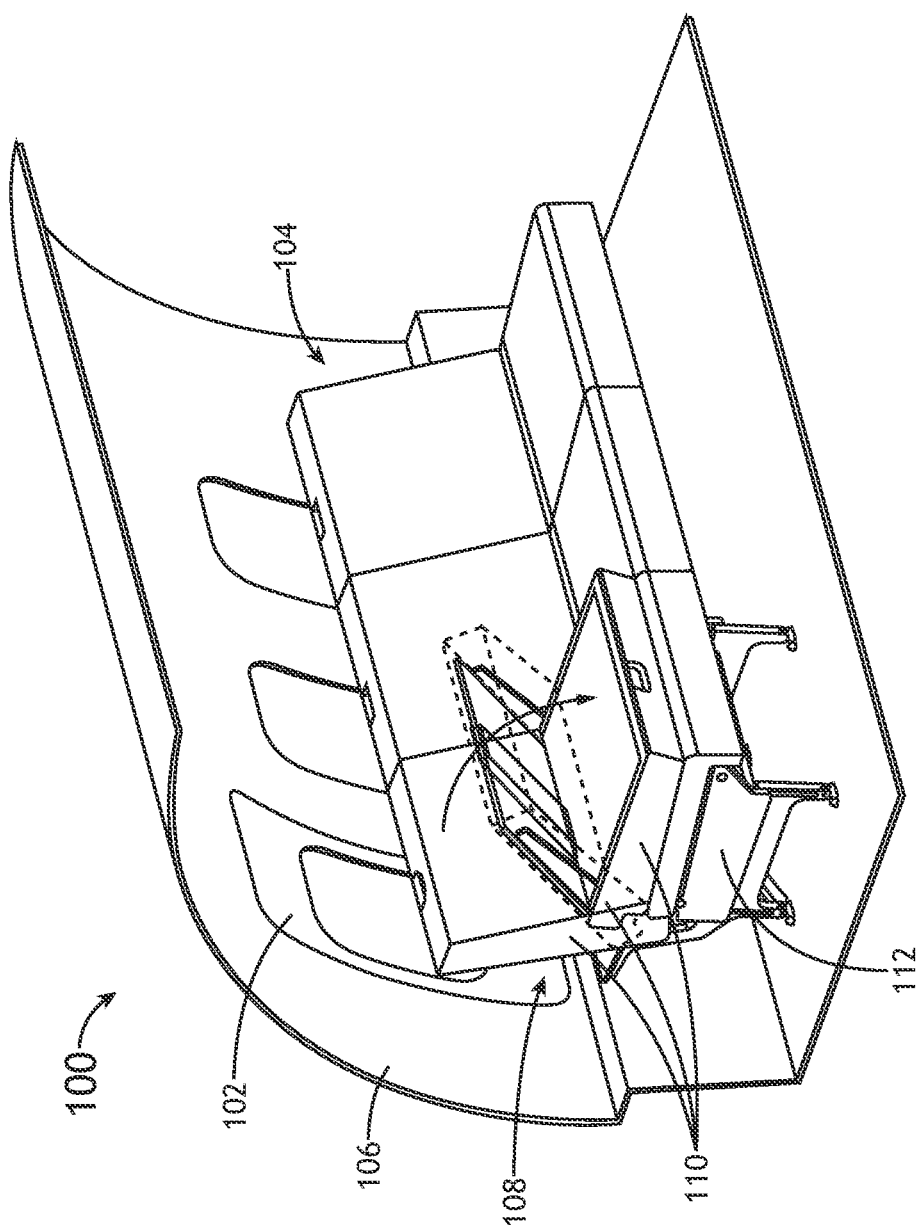
FIG. 1B is a perspective view of the aircraft cabin of FIG. 1 illustrating rotational motion of the divan backrest subassembly, in accordance with example embodiments of this disclosure.
Figure 1C:
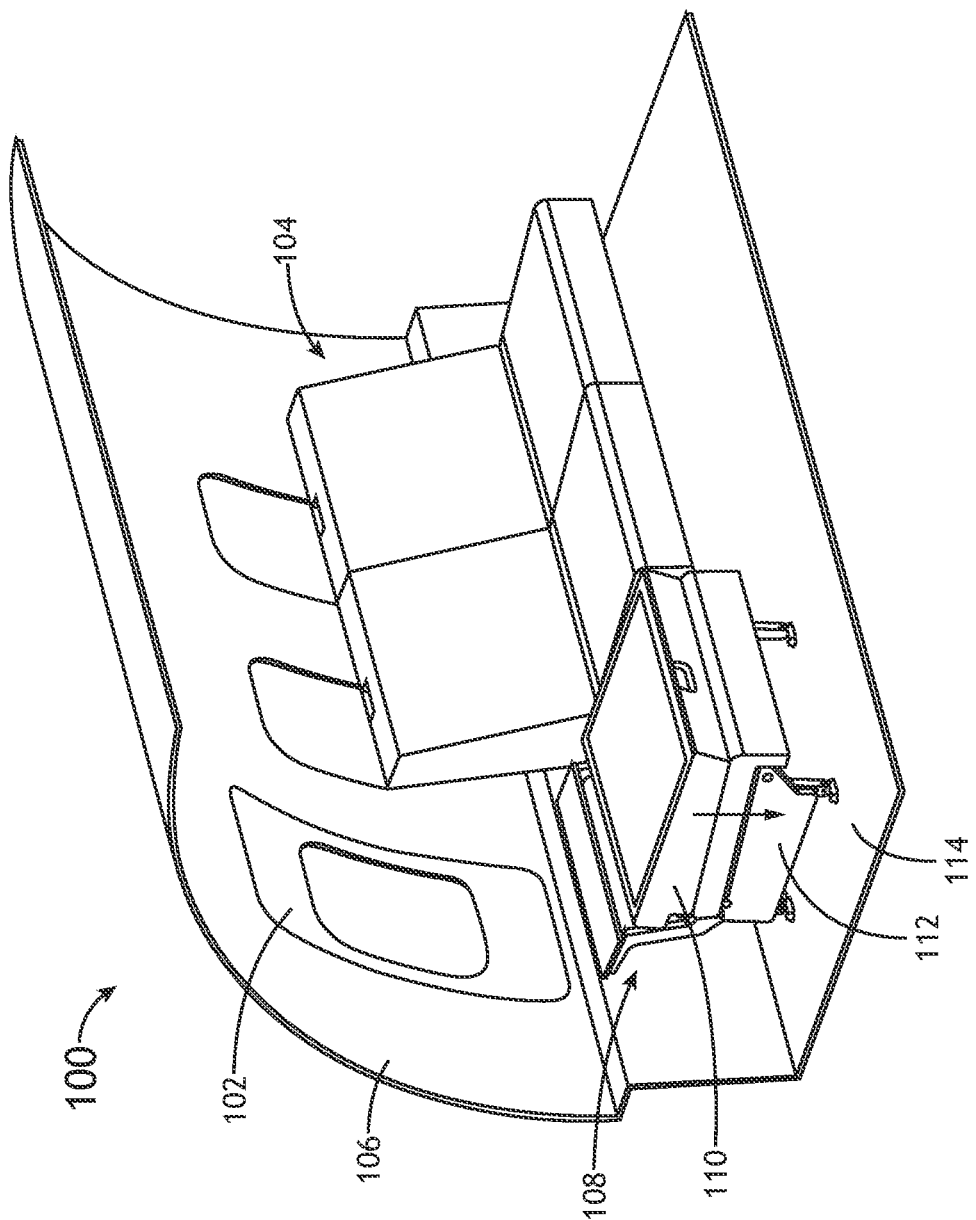
FIG. 1C is a perspective view of the aircraft cabin of FIG. 1 illustrating vertical motion of the divan seat pan subassembly, in accordance with example embodiments of this disclosure.

FIGS. 1A-C illustrate a portion of a passenger cabin 100 of an aircraft, such as a business or private jet. As shown, an emergency exit 102 is positioned in a fuselage wall of the aircraft. In some embodiments, the emergency exit 102 may be a Type-I, Type-II, or Type-III over-wing emergency exit door (OWEED) as classified according to Federal Aviation Regulation (FAR) Sec. 25.801. A divan 104 is installed in the passenger cabin 100 oriented side-facing (i.e., inboard facing) and positioned against the fuselage wall 106. In a non-limiting example, the divan 104 includes three seats 108 defining three upright seating positions for accommodating three passengers. At least one of the seats 108, for example positioned at the end of the divan 104, is positioned directly in front of the emergency exit 102 and is reconfigurable for step-up compliance with the requirements of the emergency exit 102.

FIG. 1A illustrates all three seats 108 of the divan 104 in their upright sitting position compliant for TTOL. The frame members associated with the middle seat and opposite end seat are shown within their respective frame members for clarity. FIG. 1B illustrates the rotational capability of the backrest subassembly 110 of the repositionable seat as discussed in detail below. In use, the backrest subassembly 110 is configured to rotate between a first position in which the backrest subassembly 110 is upright, and a second position in which the backrest subassembly 110 is overlaying, but not required to be in contact with, the underlying seat pan subassembly 112. FIG. 1B illustrates the backrest subassembly 110 in each of its fully upright, fully overlaid, and intermediate positions. FIG. 1C illustrates the backrest subassembly 110 rotated to overlay the seat pan subassembly 112, and the seat pan assembly 112 lowered toward the floor 114. FIG. 1A therefore illustrates the seat 108 upright for sitting and FIG. 1C illustrates the seat 108 repositioned for emergency egress/ingress step-up compliance. Comparing FIGS. 1A and 1C, it is evident that the seat pan assembly is repositioned vertically lower than the seat pans of the other seats.

Figure 2A:
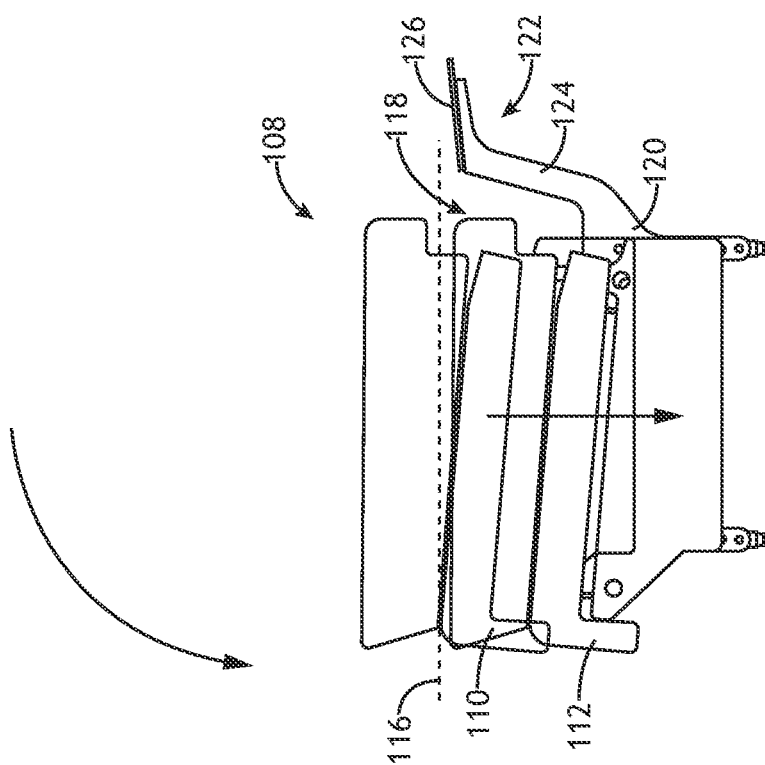
FIG. 2A is a side view of the repositionable divan seat illustrating rotational motion of the backrest subassembly, in accordance with example embodiments of this disclosure.
Figure 2B:
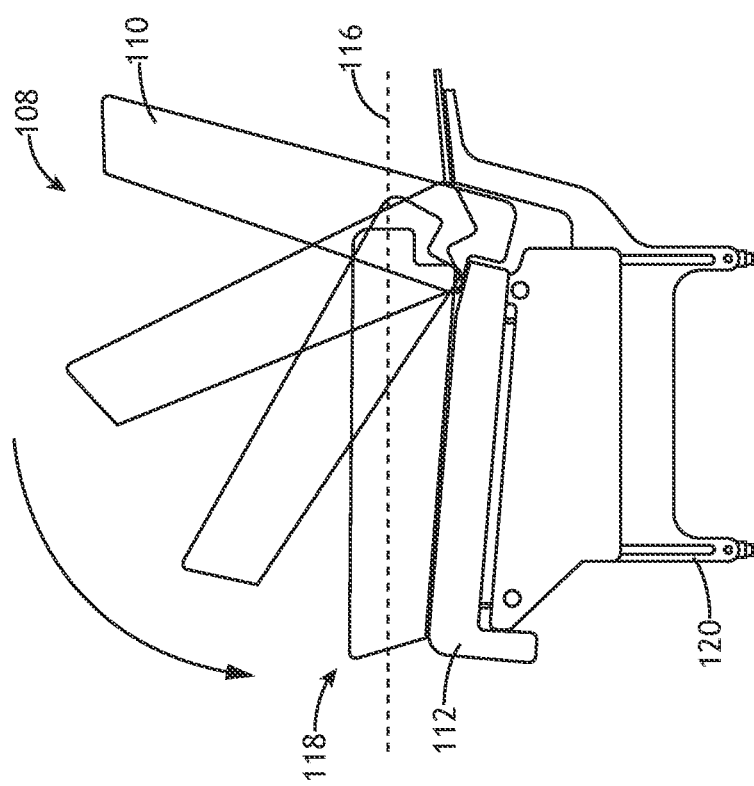
FIG. 2B is a side view of the repositionable divan seat illustrating vertical motion of the seat pan subassembly to achieve step-up compliance in relation to a maximum step-up height reference plane, in accordance with example embodiments of this disclosure.

FIGS. 2A and 2B illustrate the motions of the backrest subassembly 110 and the seat pan subassembly 112 for achieving compliant step-up height. Reference plane 116 indicates a not-to-be exceeded step-up height, for instance 20 inches for a Type-III exit. The divan seat 108 includes an upper frame assembly 118, generally including the seat pan subassembly 112 and the backrest subassembly, mounted on a lower frame assembly 120. When upright, the backrest subassembly 110 is near vertical. When rotated to the overlaying position, the backrest subassembly 110, or at least the backside thereof, is substantially horizontal to form a stepping surface for use when entering or exiting the aircraft. As shown in FIG. 2B, when the backrest subassembly 110 is rotated downward into the fully overlaying position, and the seat pan subassembly 112 is fully lowered, the backside of the backrest subassembly 110 functioning and the stepping surface is no higher than the maximum step-up height, for instance not more than 20 inches.

The movements of the backrest assembly 110 and the seat pan assembly 112 may be separate or coordinated, may occur simultaneously or sequentially, and may be performed in any order. In some embodiments, the lower frame assembly 120 further includes a step 122 that extends away from the outboard side of the divan seat 108. In some embodiments, the step 122 may include a support arm 124, or a pair support arms in a symmetrical arrangement, extending upwardly and supporting a platform 126 positioned atop the one or more support arms 124. In use, the platform 126 may function as a stepping surface and/or a filler occupying the empty space between the backrest assembly 110 and the fuselage wall. As shown, the platform 126 and the repositioned backrest assembly 110 are substantially horizontally aligned to provide a substantially continuous stepping surface for egress and ingress.

FIGS. 3A and 3B schematically illustrate a passenger restraint assembly 128 for use with the divan seat 108. In embodiments, the passenger restrain assembly 128 includes a first webbing portion 130 routed through the backrest subassembly 110, and a second webbing portion 132, continuous with the first webbing portion 130, routed through the seat pan subassembly 112. The second webbing portion 132 may be wound on a retractor 134 operable for paying in and out the webbing. In embodiments in which the divan is TTOL compliant, an airbag 136 may be mounted to the first webbing portion 130. In some embodiments, the first webbing portion 130 may be guided out of the top of the backrest subassembly 110 through an exit bezel 138 positioned at the top of the backrest subassembly 110.

Referring to FIG. 3B, in some embodiments the passenger restraint assembly 128 further includes at least one first roller 140 rotatably mounted to the backrest subassembly 110 configured to interact with the first webbing portion 130, and at least one second roller 142 rotatably mounted to the seat pan subassembly 112 configured to interact with the second webbing portion 132. In use, each of the first and second rollers 140, 142 operate to guide their respective webbing portions as the backrest subassembly 110 rotates relative to the seat pan subassembly 110.

Figure 4:
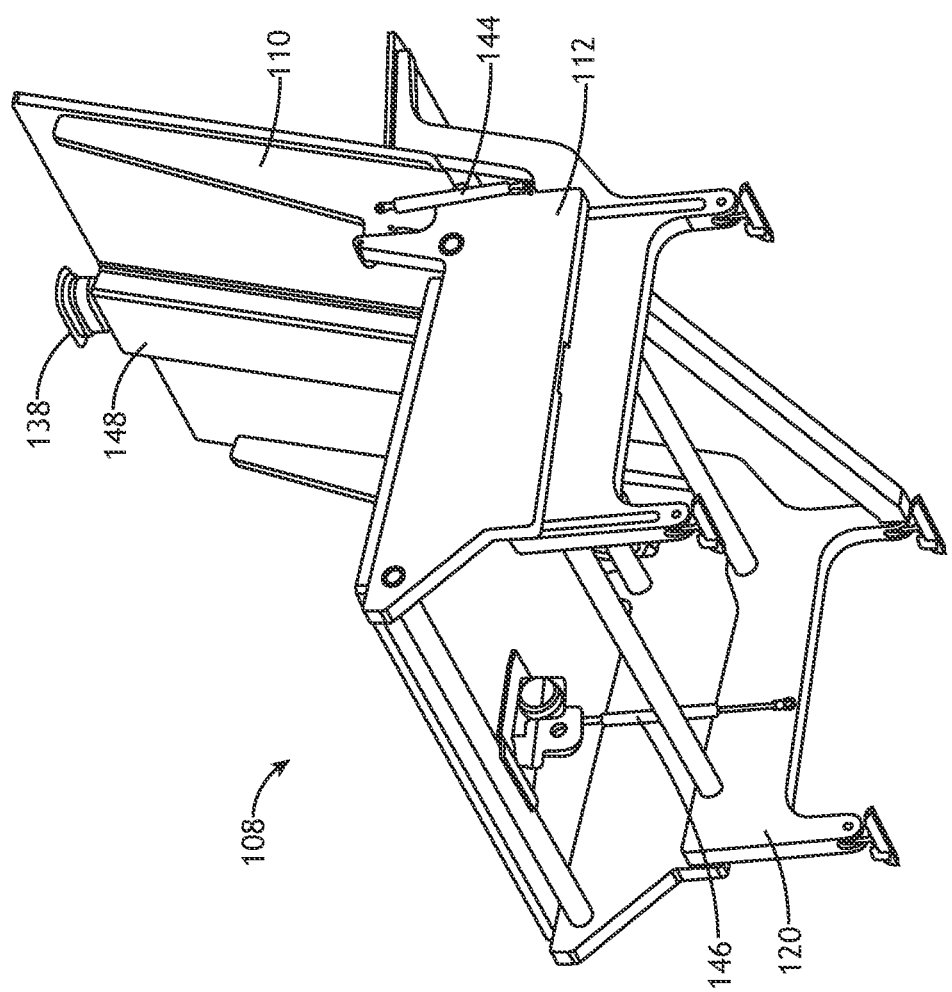
FIG. 4 is a bottom perspective view of the repositionable divan seat illustrating first and second dampers associated with the divan subassemblies, in accordance with example embodiments of this disclosure.

FIG. 4 illustrates dampers for motion control of the repositionable components of the divan seat 108. In embodiments, at least one first damper 144 has a first end mounted to the backrest subassembly 110 and a second end mounted to the seat pan subassembly 112. In some embodiments, the first damper 144 may be a gas spring, and two gas springs may be provided in a symmetrical arrangement on both sides of the divan seat 108. In use, each first damper 144 controls the rotational motion of the backrest subassembly 110. In some embodiments, when fully extended, the at least one first damper 144 may be configured to prevent further rotation of the backrest subassembly 110 toward the seat pan subassembly 112, thereby helping to maintain the substantially horizontal position and stability of the stepping surface.

The divan seat 108 may further include at least one second damper 146 having a first end mounted to the seat pan subassembly 112 and a second end mounted to the lower frame assembly 120. In some embodiments, the second damper 146 may be a gas spring, and two gas springs may be provided in a symmetrical arrangement on both sides of the divan seat 108. In use, each second damper 144 controls the translation motion (i.e., vertical raising and vertical lowering) of the seat pan subassembly 112. FIG. 4 further illustrates a tunnel 148 in which the passenger restraint webbing may be routed, and the exit bezel 138 positioned at the top end of the tunnel.

Figure 5A:
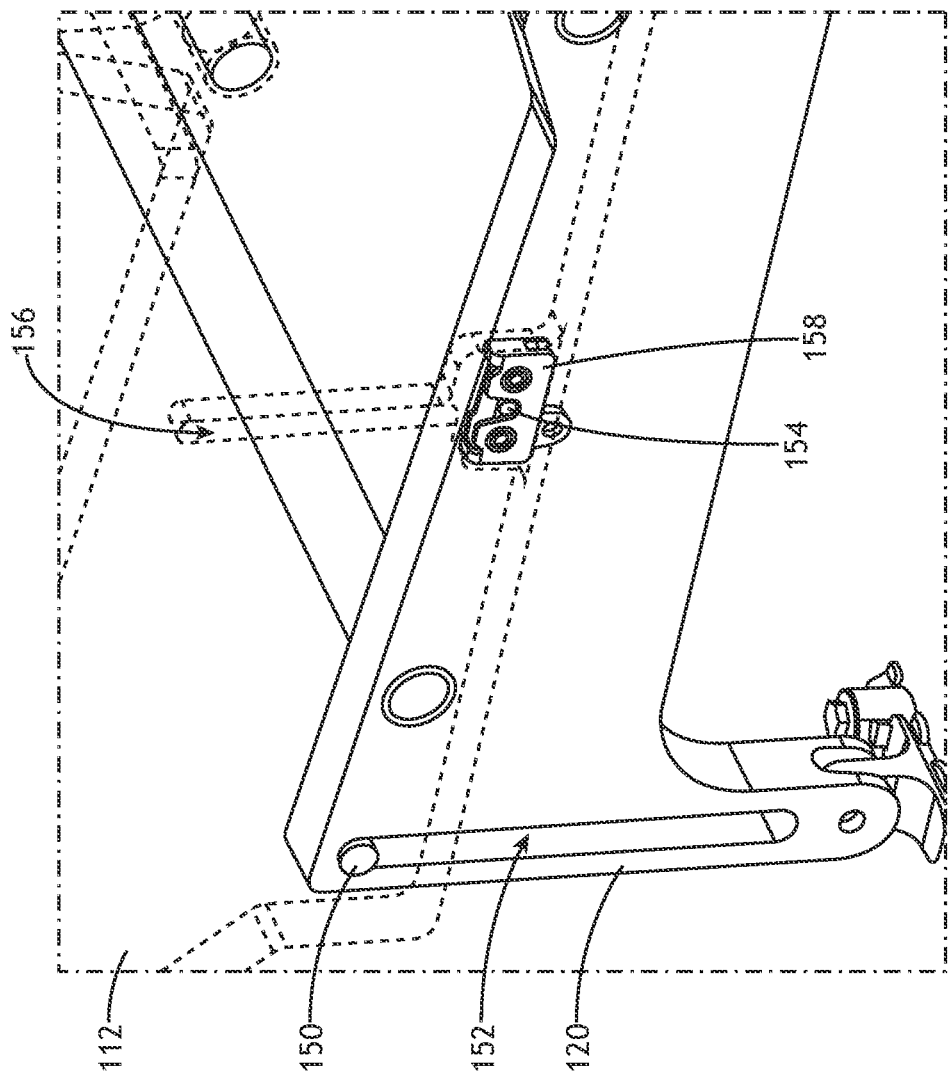
FIG. 5A is an enlarged perspective view illustrating a non-limiting example of an interface between the lower frame assembly and the seat pan subassembly, showing the seat pan subassembly fully raised and locked in position, in accordance with example embodiments of this disclosure.
Figure 5B:
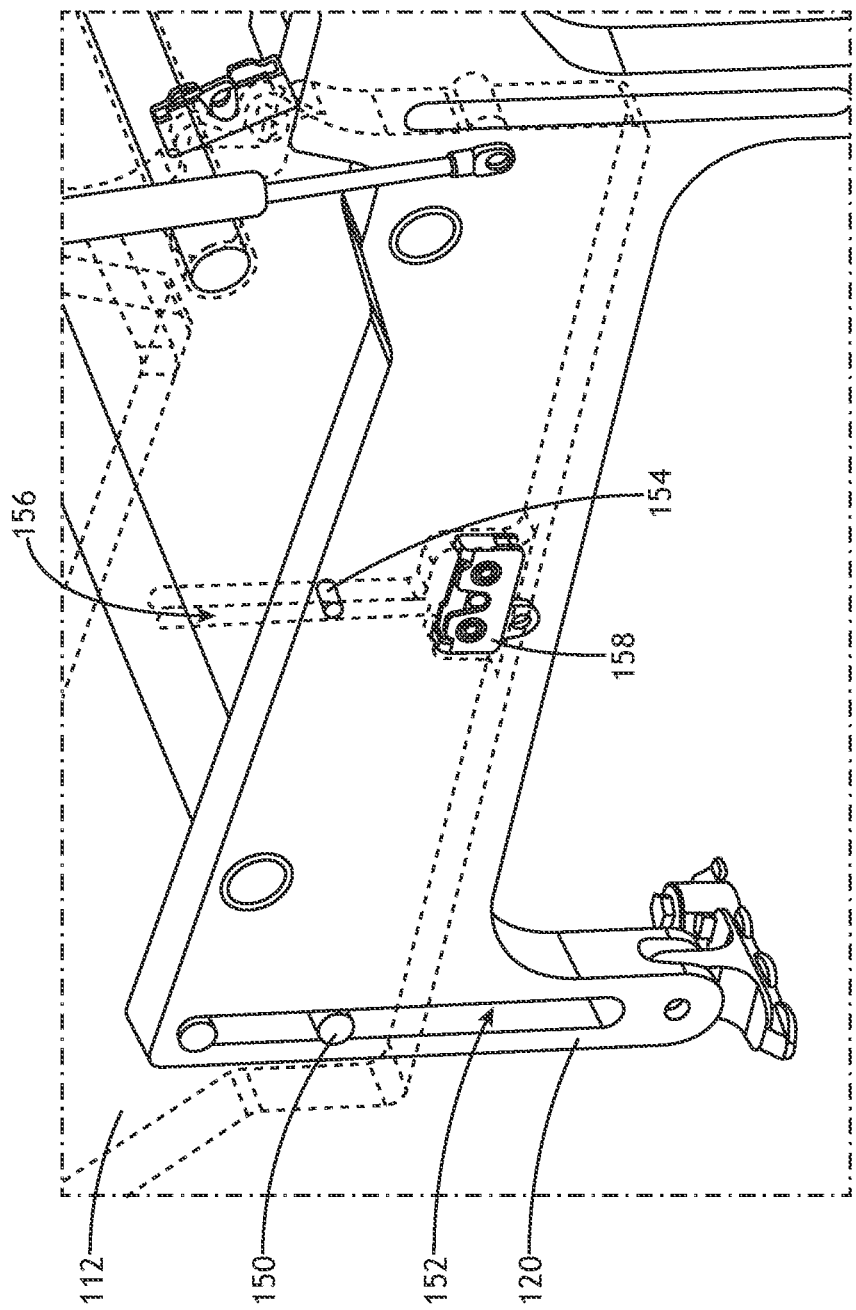
FIG. 5B is an enlarged perspective view illustrating the interface between the lower frame assembly and the seat pan subassembly, showing the seat pan subassembly unlocked and at least partially lowered, in accordance with example embodiments of this disclosure.

FIGS. 5A and 5B illustrate an exemplary interface for guiding motion of the seat pan subassembly 112 relative to the lower frame assembly 120. In some embodiments, the motion path of the seat pan subassembly 112 is vertical. In a non-limiting interface example, guides 150 carried on the seat pan subassembly 112 travel within slots or guideways 152 formed on the lower frame assembly 120, for instance on each leg of the lower frame assembly 120. Each guideway 152 may be linear and oriented vertical or near vertical. In addition, with a further association to a lock assembly, the lower frame assembly 120 may carry guides 154 configured to travel along slots or guideways 156 formed on the seat pan subassembly 112. As the seat pan subassembly 112 moves up and down, the guides travel within their respective guideways. The guides and guideways may be provided in a symmetrical arrangement on both sides of the divan seat.

FIGS. 5A and 5B further illustrate a locking functionality of the guide 154 and guideway 156 pairing. As shown in FIG. 5A, a seat pan lock 158 carried on an inboard side of the seat pan subassembly 112 is configured to capture the guide 154 to lock the seat pan subassembly 112 in the fully raised position relative to the lower frame assembly 120. As shown in FIG. 5B, when the seat pan lock 158 is open to release the captive guide 154, the seat pan subassembly 112 is able to move relative to the lower frame assembly 120. Seat pan locks 158 may be provided in a symmetrical arrangement on both sides of the divan seat.

Figure 6:
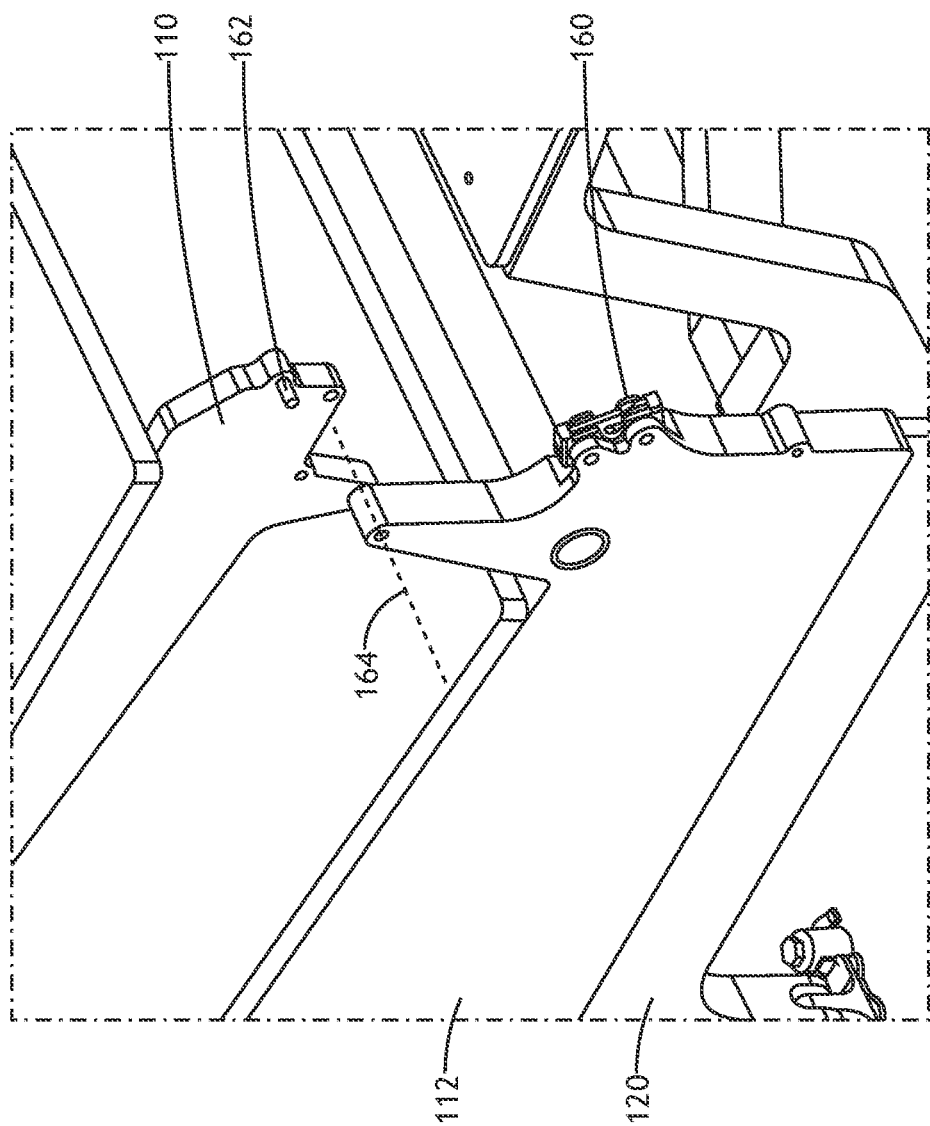
FIG. 6 is an enlarged perspective view illustrating a portion of the lock assembly associated with backrest subassembly rotation, in accordance with example embodiments of this disclosure.

FIG. 6 illustrates a backrest lock 160 and pin 162 pairing. In use, a backrest lock 160 mounted to the seat pan subassembly 112 is configured to capture a pin mounted to the backrest subassembly 110. In use, the backrest lock 160 captures the pin 160 to prevent forward rotation of the backrest subassembly 110. When the backrest lock 162 is open, the captive 162 is released thereby allowing the backrest subassembly 110 to rotate forward toward horizontal. Backrest locks 160 and pins 162 may be provided in a symmetrical arrangement on both sides of the divan seat. FIG. 6 further illustrates an exemplary rotation axis 164 of the backrest subassembly 110.

Figure 7:
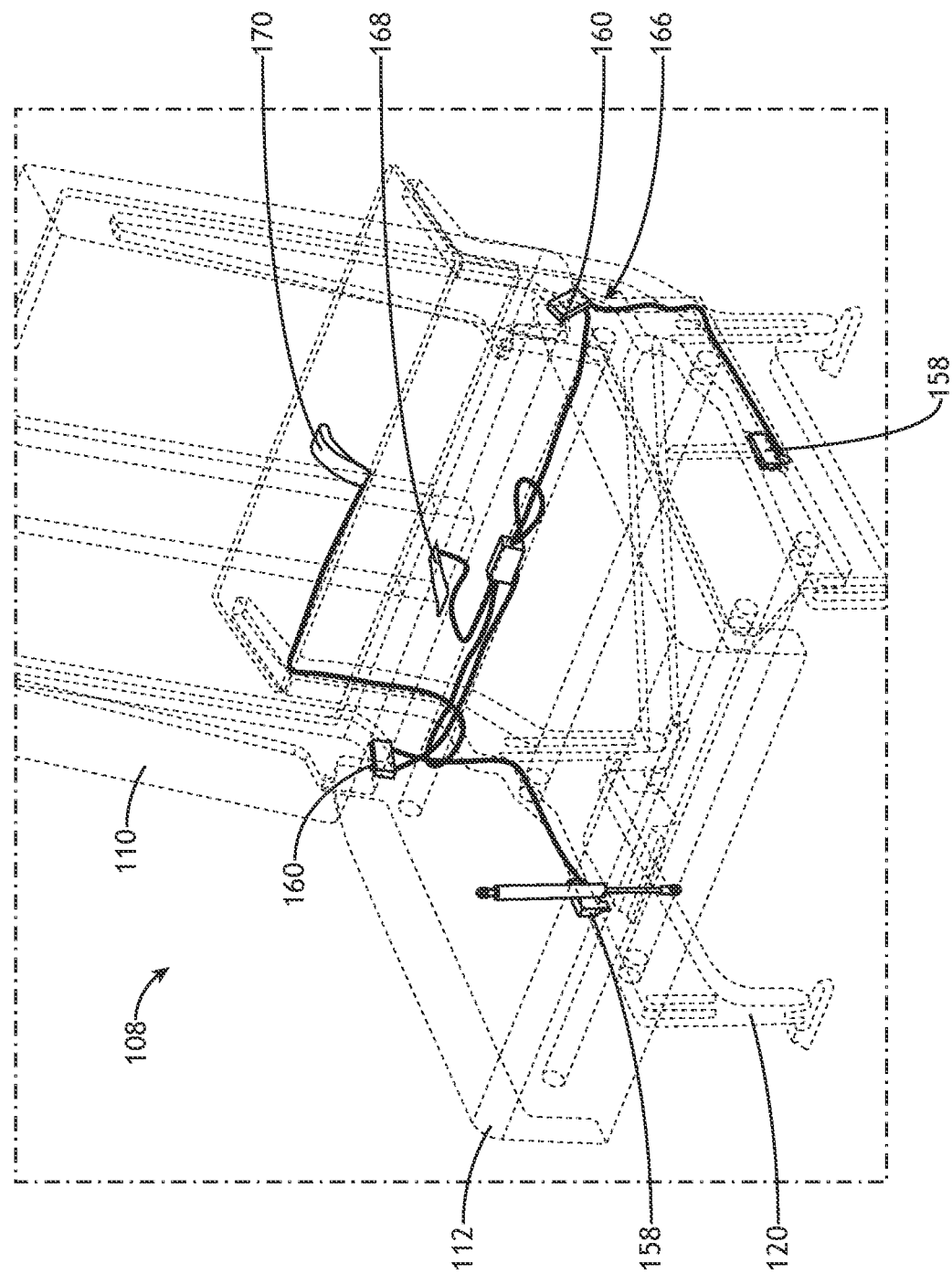
FIG. 7 is a perspective view of the repositionable divan seat shown in transparency to illustrate the lock assembly associated with the backrest and seat pan subassemblies, in accordance with example embodiments of this disclosure.

FIG. 7 illustrates further elements and aspects of the lock assembly 166 for locking component motions of the divan seat 108. As discussed above, the divan seat 108 may be equipped with a plurality of seat pan locks 158 and backrest locks 160 for locking the respective motions of the backrest subassembly 110 and the seat pan subassembly 112. The lock assembly 166 further includes a first actuator 168 positioned on and accessible from an inboard side of the divan seat 108, and a second actuator 170 positioned on an accessible from an outboard side of the divan seat 108. Each actuator 168, 170 be a pull strap as shown. The lock assembly 166 further includes cabling routed through the divan seat 108 and interconnecting each of the first and second actuators 168, 170 to each of the locks 158, 160 of each of the backrest lock subassembly 110 and the seat pan lock subassembly 112. In some embodiments, the cabling may be Bowden-style cable including a wire configured to translate within a cable jacket. The mechanism by which the locks open and close may be conventional. In embodiments, the locks 158, 160 may be disengaged by either of the actuators 168 or 170.

Figure 8B:
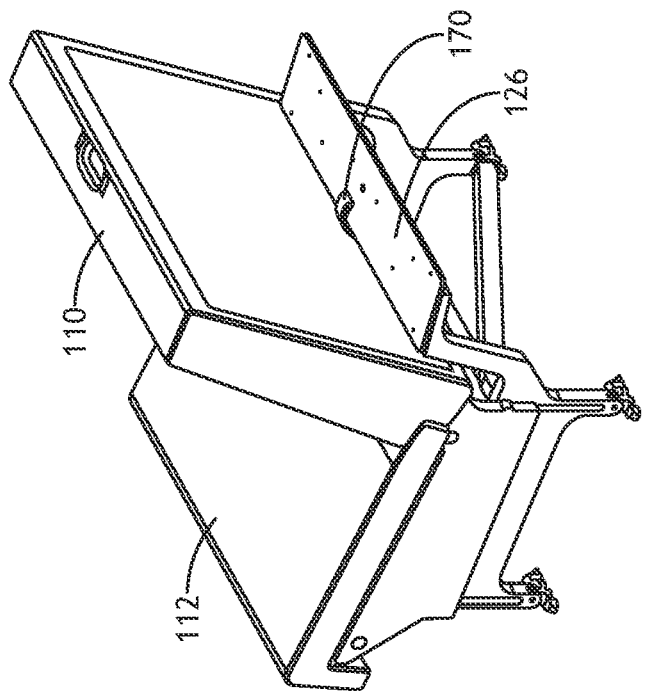
FIG. 8B is a rear perspective view illustrating the repositionable divan seat and showing an outboard actuator of the lock assembly, in accordance with example embodiments of this disclosure.
Figure 8A:
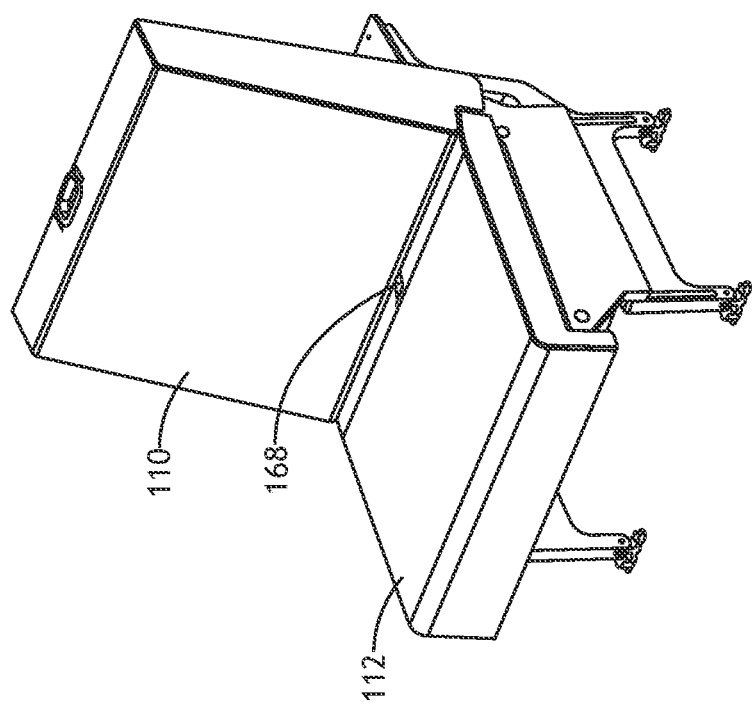
FIG. 8A is a front perspective view illustrating the repositionable divan seat and showing an inboard actuator of the lock assembly, in accordance with example embodiments of this disclosure.

FIGS. 8A and 8B further illustrate the inboard and outboard pull strap 168, 170 locations for releasing the seat components for repositioning. The inboard pull strap 168 is shown presented at the front of the seat at the interface between the seat pan subassembly 112 and the backrest subassembly 110, for use from within the aircraft. The outboard pull strap 170 is shown presented at the back of the seat at the interface between the backrest subassembly 110 and the platform 126, for use from outside of the aircraft.

From the above description, it is clear that the inventive concepts disclosed herein are well adapted to achieve the objectives and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A divan including two or more laterally adjacent seats, at least one of the seats comprising:
   a lower frame assembly attachable to a floor;
   an upper frame assembly comprising:
      a seat pan subassembly movably attached to the lower frame assembly; and
      a backrest subassembly rotatably attached to the seat pan subassembly;
   a lock assembly configured to lock at least one of rotational motion of the backrest subassembly relative to the seat pan subassembly, and motion of the seat pan subassembly relative to the lower frame assembly; and
   a passenger restraint assembly comprising:
      a first webbing portion routed through the backrest subassembly;
      an airbag associated with the first webbing portion;
      a second webbing portion, continuous with the first webbing portion, routed through the seat pan subassembly;
      a retractor upon which the second webbing portion is wound;
      at least one first roller rotatably mounted to the backrest subassembly and configured to interact with the first webbing portion; and
      at least one second roller rotatably mounted to the seat pan subassembly and configured to interact with the second webbing portion;
   wherein, in use:
      the backrest subassembly is configured to rotate between a first position in which the backrest subassembly is upright and a second position in which the backrest assembly overlays the seat pan subassembly; and
      the seat pan subassembly is configured to raise and lower relative to the lower frame assembly.

2. The divan according to claim 1, wherein a height of the backrest subassembly, when the backrest subassembly is in the second position and the seat pan subassembly is fully lowered relative to the lower frame assembly, is not more than 20 inches, as measured from a floor to which the lower frame assembly is attached to a top of the backrest subassembly when in the second position.

3. The divan according to claim 1, wherein the lower frame assembly comprises a step positioned behind the seat pan subassembly, and wherein the step and the backrest subassembly, when the backrest subassembly is in the second position, are substantially horizontally aligned.

4. The divan according to claim 1, wherein the seat pan subassembly and the lower frame assembly interface via a guide assembly configured to guide vertical motion of the seat pan subassembly relative to the lower frame assembly, the guide assembly comprising at least one guide carried on one of the seat pan subassembly and the lower frame assembly, and at least one slot formed on the other of the seat pan subassembly and the lower frame assembly, the at least one guide configured to travel along the at least one slot.

5. The divan according to claim 1, further comprising at least one first damper having a first end mounted to the backrest subassembly and a second end mounted to the seat pan subassembly, the at least one first damper, when fully extended, configured to prevent further rotation of the backrest subassembly toward the seat pan subassembly.

6. The divan according to claim 1, further comprising at least one second damper having a first end mounted to the seat pan subassembly and a second end mounted to the lower frame assembly, the at least one second damper configured to control vertical motion of the seat pan subassembly relative to the lower frame assembly.

7. The divan according to claim 1, wherein the lock assembly comprises:
   a backrest lock subassembly comprising at least one lock mounted to one of the seat pan subassembly and the backrest subassembly, and at least one pin mounted to the other of the seat pan subassembly and the backrest subassembly, each lock configured to capture and release its respective pin;
   a seat pan lock subassembly comprising at least one lock mounted to one of the seat pan subassembly and the lower frame assembly, and at least one pin mounted to the other of the seat pan subassembly and the lower frame assembly, each lock configured to capture and release its respective pin;

a first actuator positioned on and accessible from an inboard side of the divan;

a second actuator positioned on an accessible from an outboard side of the divan; and cabling interconnecting each of the first and second actuators to each of the locks of each of the backrest lock subassembly and the seat pan lock subassembly.

8. A passenger seating configuration for an aircraft including an emergency exit positioned in an exterior wall and over a wing of the aircraft, the passenger seating configuration comprising:

a divan positioned against the exterior wall and facing inboard, the divan including two or more laterally adjacent seats, at least one of the seats positioned directly in front of the emergency exit and comprising:

a lower frame assembly attachable to a floor;

an upper frame assembly comprising:
a seat pan subassembly movably attached to the lower frame assembly; and
a backrest subassembly rotatably attached to the seat pan subassembly; and a lock assembly configured to lock at least one of rotational motion of the backrest subassembly relative to the seat pan subassembly, and motion of the seat pan subassembly relative to the lower frame assembly;

wherein, in use:
the backrest subassembly is configured to rotate between a first position in which the backrest subassembly is upright and a second position in which the backrest assembly overlays the seat pan subassembly; and
the seat pan subassembly is configured to raise and lower relative to the lower frame assembly.

9. The passenger seating configuration according to claim 8, wherein:

the emergency exit is a Type-III exit pursuant to Federal Aviation Regulation (FAR) Sec. 25.801; and a height of the backrest subassembly, when the backrest subassembly is in the second position and the seat pan subassembly is fully lowered relative to the lower frame assembly, is not more than 20 inches, as measured from a floor to which the lower frame assembly is attached to a top of the backrest subassembly when in the second position.

10. The passenger seating configuration according to claim 8, wherein the lower frame assembly comprises a step positioned behind the seat pan subassembly, and wherein the step and the backrest subassembly, when the backrest subassembly is in the second position, are substantially horizontally aligned.

11. The passenger seating configuration according to claim 8, wherein the divan further comprises a passenger restraint assembly comprising:

a first webbing portion routed through the backrest subassembly;

an airbag associated with the first webbing portion;

a second webbing portion, continuous with the first webbing portion, routed through the seat pan subassembly; and a retractor upon which the second webbing portion is wound.

12. The passenger seating configuration according to claim 11, wherein the passenger restraint assembly further comprises:

at least one first roller rotatably mounted to the backrest subassembly and configured to interact with the first webbing portion; and at least one second roller rotatably mounted to the seat pan subassembly and configured to interact with the second webbing portion.

13. The passenger seating configuration according to claim 8, wherein the seat pan subassembly and the lower frame assembly interface via a guide assembly configured to guide vertical motion of the seat pan subassembly relative to the lower frame assembly, the guide assembly comprising at least one guide carried on one of the seat pan subassembly and the lower frame assembly, and at least one slot formed on the other of the seat pan subassembly and the lower frame assembly, the at least one guide configured to travel along the at least one slot.

14. The passenger seating configuration according to claim 8, wherein the divan further comprises at least one first damper having a first end mounted to the backrest subassembly and a second end mounted to the seat pan subassembly, the at least one first damper, when fully extended, configured to prevent further rotation of the backrest subassembly toward the seat pan subassembly.

15. The passenger seating configuration according to claim 8, wherein the divan further comprises at least one second damper having a first end mounted to the seat pan subassembly and a second end mounted to the lower frame assembly, the at least one second damper configured to control vertical motion of the seat pan subassembly relative to the lower frame assembly.

16. The passenger seating configuration according to claim 8, wherein the lock assembly comprises:

a backrest lock subassembly comprising at least one lock mounted to one of the seat pan subassembly and the backrest subassembly, and at least one pin mounted to the other of the seat pan subassembly and the backrest subassembly, each lock configured to capture and release its respective pin;

a seat pan lock subassembly comprising at least one lock mounted to one of the seat pan subassembly and the lower frame assembly, and at least one pin mounted to the other of the seat pan subassembly and the lower frame assembly, each lock configured to capture and release its respective pin;

a first actuator positioned on and accessible from an inboard side of the divan;

a second actuator positioned on an accessible from an outboard side of the divan; and cabling interconnecting each of the first and second actuators to each of the locks of each of the backrest lock subassembly and the seat pan lock subassembly.

17. The passenger seating configuration according to claim 8, wherein the lower frame assembly is fixed.

18. The passenger seating configuration according to claim 8, wherein, in use, rotational motion of the backrest subassembly and vertical motion of the seat pan may be separate or coordinated motions.

19. A divan including two or more laterally adjacent seats, at least one of the seats comprising:

a lower frame assembly attachable to a floor;

an upper frame assembly comprising:
a seat pan subassembly movably attached to the lower frame assembly; and
a backrest subassembly rotatably attached to the seat pan subassembly; and a lock assembly configured to lock at least one of rotational motion of the backrest subassembly relative to the seat pan subassembly, and motion of the seat pan subassembly relative to the lower frame assembly, the lock assembly comprising:

a backrest lock subassembly comprising at least one lock mounted to one of the seat pan subassembly and the backrest subassembly, and at least one pin mounted to the other of the seat pan subassembly and the backrest subassembly, each lock configured to capture and release its respective pin;

a seat pan lock subassembly comprising at least one lock mounted to one of the seat pan subassembly and the lower frame assembly, and at least one pin mounted to the other of the seat pan subassembly and the lower frame assembly, each lock configured to capture and release its respective pin;

a first actuator positioned on and accessible from an inboard side of the divan;

a second actuator positioned on an accessible from an outboard side of the divan; and cabling interconnecting each of the first and second actuators to each of the locks of each of the backrest lock subassembly and the seat pan lock subassembly;

wherein, in use:
the backrest subassembly is configured to rotate between a first position in which the backrest subassembly is upright and a second position in which the backrest assembly overlays the seat pan subassembly; and the seat pan subassembly is configured to raise and lower relative to the lower frame assembly.

20. The divan according to claim 19, wherein a height of the backrest subassembly, when the backrest subassembly is in the second position and the seat pan subassembly is fully lowered relative to the lower frame assembly, is not more than 20 inches, as measured from a floor to which the lower frame assembly is attached to a top of the backrest subassembly when in the second position.

* * * * *